(12) United States Patent
Harandi et al.

(10) Patent No.: US 11,072,749 B2
(45) Date of Patent: Jul. 27, 2021

(54) PROCESS AND SYSTEM FOR PROCESSING PETROLEUM FEED

(71) Applicant: ExxonMobil Chemical Patents Inc., Baytown, TX (US)

(72) Inventors: Mohsen N. Harandi, New Hope, PA (US); Paul F. Keusenkothen, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/815,056

(22) Filed: Mar. 11, 2020

(65) Prior Publication Data

US 2020/0308497 A1  Oct. 1, 2020

Related U.S. Application Data

(60) Provisional application No. 62/823,247, filed on Mar. 25, 2019.

(51) Int. Cl.
  *C10G 63/04* (2006.01)
  *C10G 69/06* (2006.01)
  (Continued)

(52) U.S. Cl.
  CPC .............. *C10G 63/04* (2013.01); *B01D 3/06* (2013.01); *B01J 8/1818* (2013.01); *B01J 8/24* (2013.01);
  (Continued)

(58) Field of Classification Search
  CPC .......... C10G 9/002; C10G 9/02; C10G 11/18; C10G 27/00; C10G 27/04; C10G 53/14; C10G 55/00; C10G 55/02; C10G 55/04; C10G 57/00; C10G 57/02; C10G 63/04; C10G 69/06; C10G 69/126; C10G 2300/1044; C10G 2300/1074;
  (Continued)

(56) References Cited

U.S. PATENT DOCUMENTS 3,365,387 A   1/1968  Cahn et al.
3,617,493 A   11/1971 Wirth et al.
(Continued)

FOREIGN PATENT DOCUMENTS

WO    93/02025 A    2/1993
WO    2005/113717 A  12/2005
WO    2018/111574 A  6/2018

OTHER PUBLICATIONS

Cavini et al., "Oxidative dehydrogenation of ethane and propane: How far from commercial implementation?", Catalysis Today, vol. 27, (2007), pp. 113-131.
(Continued)

*Primary Examiner* — Brian A McCaig

(57) ABSTRACT

A novel process/system for flexibly producing chemicals and fuels from a petroleum feed such as crude comprise a flashing drum, a first cracker (e.g., a fluidized bed pyrolysis cracker or an oxidative cracker), and an olefin-to-gasoline reaction zone. The process/system can also include a steam cracker and a hydrotreater. The process/system can convert crude oil into hydrogen, C2-C4 olefins, gas oil and distillates with various amounts by adjusting the cut point of the bottoms effluent exiting the flashing drum.

23 Claims, 1 Drawing Sheet

(51) Int. Cl.
*B01J 8/18* (2006.01)
*B01J 19/24* (2006.01)
*B01D 3/06* (2006.01)
*B01J 8/24* (2006.01)

(52) U.S. Cl.
CPC ............ *B01J 19/245* (2013.01); *C10G 69/06* (2013.01); *B01J 2208/00752* (2013.01); *B01J 2219/0004* (2013.01); *C10G 2300/202* (2013.01); *C10G 2400/02* (2013.01)

(58) Field of Classification Search
CPC . C10G 2300/202; C10G 2400/02; C10L 1/04; C10L 2290/06; C10L 2290/24; C10L 2290/543; B01J 8/1818; B01J 8/1836; B01J 8/24; B01J 8/26; B01J 2208/00513; B01J 19/245
See application file for complete search history.

(56) References Cited

U.S. PATENT DOCUMENTS

| | | | |
|---|---|---|---|
| 3,671,424 A | 6/1972 | Saxton | |
| 3,702,886 A | 11/1972 | Argauer et al. | |
| 3,709,979 A | 1/1973 | Chu | |
| 3,832,449 A | 8/1974 | Rosinski et al. | |
| 4,016,245 A | 4/1977 | Plank et al. | |
| 4,046,839 A | 9/1977 | Papetti | |
| 4,076,842 A | 2/1978 | Plank et al. | |
| 4,076,979 A | 2/1978 | Walter et al. | |
| 4,097,363 A | 6/1978 | McKinney et al. | |
| RE29,948 E | 3/1979 | Dwyer et al. | |
| 4,318,800 A | 3/1982 | Woebcke et al. | |
| 4,370,303 A | 1/1983 | Woebcke et al. | |
| 4,414,423 A | 11/1983 | Miller | |
| 4,417,086 A | 11/1983 | Miller | |
| 4,552,645 A | 11/1985 | Gartside et al. | |
| 4,788,364 A | 11/1988 | Harandi | |
| 4,828,681 A | 5/1989 | Yourtee et al. | |
| 5,043,499 A | 8/1991 | Harandi et al. | |
| 5,365,011 A | 11/1994 | Ramachandran et al. | |
| 5,580,443 A | 12/1996 | Yoshida et al. | |
| 5,785,739 A | 7/1998 | Baker | |
| 6,365,792 B1 | 4/2002 | Stapf et al. | |
| 6,419,885 B1 | 7/2002 | Di Nicolantonio et al. | |
| 7,090,081 B2 | 8/2006 | Vaughn et al. | |
| 7,138,047 B2 | 11/2006 | Stell et al. | |
| 7,235,705 B2 | 6/2007 | Stell | |
| 7,244,871 B2 | 7/2007 | Stell et al. | |
| 7,309,383 B2 | 12/2007 | Beech, Jr. et al. | |
| 7,674,366 B2 | 3/2010 | Strack et al. | |
| 7,718,049 B2 | 5/2010 | Strack et al. | |
| 7,993,435 B2 | 8/2011 | Stell et al. | |
| 8,105,479 B2 | 1/2012 | Ou et al. | |
| 8,361,311 B2 | 1/2013 | Davis et al. | |
| 9,358,516 B2 | 6/2016 | Tammera et al. | |
| 9,637,694 B2 | 5/2017 | Evans et al. | |
| 9,777,227 B2 | 10/2017 | Soulanidis et al. | |
| 2005/0209495 A1 | 9/2005 | McCoy et al. | |
| 2011/0042269 A1* | 2/2011 | Kuechler | C10G 45/00 208/57 |
| 2012/0024749 A1 | 2/2012 | Strack et al. | |
| 2016/0264492 A1* | 9/2016 | Smalley | C10G 50/00 |
| 2018/0170832 A1 | 6/2018 | Janda et al. | |
| 2018/0171242 A1 | 6/2018 | Harandi | |
| 2019/0144756 A1 | 5/2019 | Le et al. | |

OTHER PUBLICATIONS

Corma et al., "Crude oil to chemicals: light olefins from crude oil", Catal. Sci. Technol., vol. 7, 2017, pp. 12-46.
"BASF Cracker Makes Ethylene from Crude Oil", Industrial and Engineering Chemistry, vol. 53, No. 11 Nov. 1961, pp. 26A-28A.

* cited by examiner

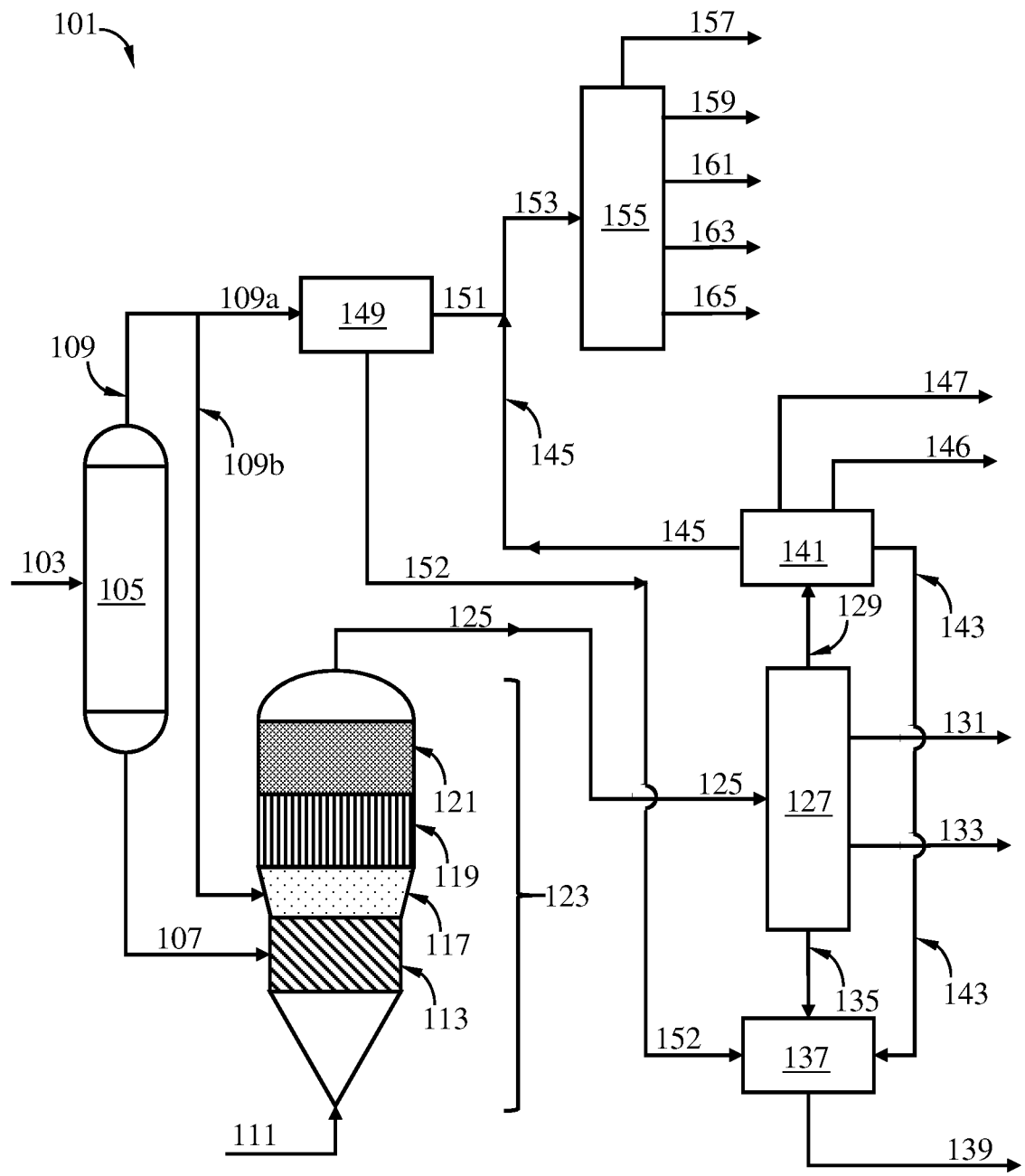

PROCESS AND SYSTEM FOR PROCESSING PETROLEUM FEED

CROSS-REFERENCE TO RELATED APPLICATIONS

This application claims priority to U.S. Ser. No. 62/823,247, filed Mar. 25, 2019, herein incorporated by reference.

FIELD OF THE DISCLOSURE

This disclosure relates to processes and systems for processing petroleum feeds. In particular, this disclosure relates to processes and systems for processing petroleum feeds such as crude oil and/or fraction thereof for making various products including olefins and fuel oil products. This disclosure is useful, e.g., for producing olefins, fuel oil products, and the like, in a flexible manner from crude oil.

BACKGROUND OF THE DISCLOSURE

Steam cracking, also referred to as pyrolysis, has long been used to crack various hydrocarbon feedstocks into olefins, preferably light olefins such as ethylene, propylene, and butenes. Conventional steam cracking utilizes a pyrolysis furnace ("steam cracker") which has two main sections: a convection section and a radiant section. The hydrocarbon feedstock typically enters the convection section of the furnace as a liquid (except for light feedstocks which enter as a vapor) wherein it is typically heated and vaporized by indirect contact with hot flue gas from the radiant section and by direct contact with steam. The vaporized feedstock and steam mixture is then introduced into the radiant section where the cracking takes place. The resulting products, including olefins, leave the pyrolysis furnace for further downstream processing, including quenching.

Additionally, during transport some naphthas are contaminated with heavy crude oil containing non-volatile components. Conventional pyrolysis furnaces do not have the flexibility to process residues, crudes, or many residue or crude contaminated gas oils or naphthas which are contaminated with non-volatile components. Non-volatiles, if present in the feed to a steam cracker, can easily cause fouling of the steam cracker.

To address coking problems, U.S. Pat. No. 3,617,493, which is incorporated herein by reference, discloses the use of an external vaporization drum for the crude oil feed and discloses the use of a first flash to remove naphtha as vapor and a second flash to remove vapors with a boiling point between 230 and 590° C. (450 and 1100° F.). The vapors are cracked in the pyrolysis furnace into olefins, and the separated liquids from the two flash tanks are removed, stripped with steam, and used as fuel. The liquids still contain substantial quantity of hydrocarbons, which, if converted into higher-value lighter hydrocarbons, especially olefins, via cracking, would bring substantial additional value to the crude oil feed. However, converting the heavy non-volatile liquid from the flashing drum is not an easy undertaking.

Thus, for decades the petrochemical industry has been trying to take advantage of relatively low-cost heavy crude oil to make substantial quantity of valuable chemicals such as olefins. However, the large portion of non-volatile production required extensive and expensive processing. There still remains a need for a process and system capable of processing heavy crudes to produce valuable chemical products such as olefins and other products such as gasoline at a high yield, particularly those having a high flexibility to adjust the product slate and their respective quantities to suit the changing needs of the market.

This disclosure satisfies this and other needs.

SUMMARY

The present inventors have devised a process and system including a first cracker (such as a fluidized bed coker or an oxidative cracker) capable of cracking heavy fractions comprising a non-volatile component to produce a product mixture comprising olefins, and an olefins-to-gasoline ("OTG") reaction zone capable of oligomerizing olefins to produce gas oil boiling range hydrocarbons. The process and system includes a flashing drum producing a vapor overhead effluent and a heavier liquid bottoms effluent which can comprise a non-volatile component. The bottoms effluent is fed into the first cracker to produce a first cracker product mixture comprising olefins. The first cracker product mixture, upon cooling, can be fed to an olefin-to-gasoline ("OTG") reaction zone to convert a portion of the olefins to hydrocarbons boiling in the gas oil range. The vapor overhead effluent from the flashing drum can be fed to a steam cracker to produce chemicals such as olefins. By adjusting the cutpoint of the liquid bottoms effluent from the flashing drum, one can flexibly adjust the quantity of fuel products, and olefins and other chemical products produced from the same or different petroleum feed such as a crude.

Thus, a first aspect of this disclosure relates to a process for processing a petroleum feed to produce a plurality of hydrocarbon products, the process comprising: (I) feeding the petroleum feed to a flashing drum; (II) obtaining a liquid bottoms effluent comprising bottoms hydrocarbons and a vapor overhead effluent comprising overhead hydrocarbons from the flashing drum, wherein the bottoms hydrocarbons optionally comprise a non-volatile component; (III) feeding at least a portion of the bottoms effluent to a first cracker through a first inlet on the first cracker; (IV) converting at least a portion of the bottoms hydrocarbons under a first set of cracking conditions in the first cracker to produce a first cracker product mixture comprising olefins; (V) feeding at least a portion of the first cracker product mixture into an olefin-to-gasoline ("OTG") reaction zone; (VI) converting at least a portion of the first cracker product mixture into gasoline in the presence of an OTG catalyst in the OTG reaction zone; and (VII) obtaining an OTG product mixture from the OTG reaction zone.

A second aspect of this disclosure relates to a system for processing a petroleum feed comprising non-volatile components, the reaction system comprising: (A) a flashing drum an inlet adapted for receiving a petroleum feed, an upper outlet in the vicinity of the top thereof adapted for discharging a vapor overhead effluent, and a lower outlet in the vicinity of the bottom thereof adapted for discharging a liquid bottoms effluent; (B) a first cracker comprising a first inlet adapted for receiving the bottoms effluent in fluid communication with the flashing drum, a second inlet adapted for receiving a plurality of solid particles carried in a hot gas stream upstream of the first inlet, and an outlet for discharging a first cracker product mixture, the first cracker capable of operating under a first set of cracking condition to effect pyrolysis of at least a portion of the bottoms effluent to produce the first cracker product mixture; (C) an optional quenching zone immediately downstream of the first cracker in fluid communication with the first cracker adapted for receiving the first cracker product mixture and a quenching stream to mix with the first cracker product mixture to cool down the first cracker product mixture and discharging a quenched effluent; (D) an optional indirect cooling zone immediately downstream of the quenching zone and in fluid communication with the quenching zone adapted for receiving the quenched effluent if the quenching zone is present, or immediately downstream of the first cracker in fluid communication with the first cracker adapted for receiving the first cracker product mixture if the optional quenching zone is absent, the indirect cooling zone comprising a heat exchanger and producing a cooled effluent; (E) an olefin-to-gasoline ("OTG") reaction zone immediately downstream of the optional indirect cooling zone, if present, or immediately downstream of the quenching zone, if the optional indirect cooling zone is absent, the OTG reaction zone comprises an inlet for receiving the quenched effluent or the cooled effluent and an outlet for discharging an OTG product mixture; and (F) a first product recovery zone adapted for receiving at least a portion of the OTG product mixture, and separate one or more of the following therefrom: hydrogen; C2-C4 hydrocarbons;

naphtha, gas oil; and tar.

BRIEF DESCRIPTION OF THE DRAWINGS

FIG. 1 is a schematic diagram showing a process/system of this disclosure including a flashing drum, a first cracker such as a fluidize bed coker or an oxidation cracker, a quenching zone, an indirect cooling zone, an OTG reaction zone, a steam cracker, product recovery zones, and a hydrotreater.

DETAILED DESCRIPTION

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other step, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contain a certain level of error due to the limitation of the technique and equipment used for making the measurement.

As used herein, the indefinite article "a" or "an" shall mean "at least one" unless specified to the contrary or the context clearly indicates otherwise. Thus, embodiments using "a fractionation column" include embodiments where one, two or more fractionation columns are used, unless specified to the contrary or the context clearly indicates that only one fractionation column is used.

"C2-C3 paraffins-rich" as used herein means the material in question such as a feed or an effluent comprises ethane and/or propane at a total concentration thereof of at least 50 mol %, based on the total moles of molecules in the material.

"Consisting essentially of" as used herein means the composition, feed, or effluent comprises a given component at a concentration of at least 60 wt %, preferably at least 70 wt %, more preferably at least 80 wt %, more preferably at least 90 wt %, still more preferably at least 95 wt %, based on the total weight of the composition, feed, or effluent in question.

"Crude," as used herein, means whole crude oil as it issues from a wellhead, production field facility, transportation facility, or other initial field processing facility, optionally including crude that has been processed by a step of desalting, treating, and/or other steps as may be necessary to render it acceptable for conventional distillation in a refinery. Crude as used herein is presumed to contain resid.

"Crude fractions" as used herein mean hydrocarbon fractions obtainable from fractionation of crude.

The term "hydrocarbon" means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a C2 hydrocarbon can be ethane, ethylene, acetylene, or mixtures of at least two of them at any proportion. A "Cm to Cn hydrocarbon" or "Cm-Cn hydrocarbon," where m and n are positive integers and m<n, means any of Cm, Cm+1, Cm+2, Cn−1, Cn hydrocarbons, or any mixtures of two or more thereof. Thus, a "C2 to C3 hydrocarbon" or "C2-C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+hydrocarbon" means (i) any hydrocarbon compound comprising carbon atom(s) in its molecule at the total number of at least n, or (ii) any mixture of two or more such hydrocarbon compounds in (i). A "Cn-hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm-Cn hydrocarbon stream" means a hydrocarbon stream consisting essentially of Cm-Cn hydrocarbon(s).

In this disclosure, a location "in the vicinity of" an end (top or bottom) of a column means a location within a distance of a*Hc from the end (top or bottom) of the column, where Hc is the height of the column from the bottom to the top, and a1 ≤a≤a2, where a1 and a2 can be, independently, 0, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, or 0.33, as long as a1<a2. For example, a location in the vicinity of an end of a column can have an absolute distance from the end (top or bottom) of at most D meters, where D can be 5.0, 4.5, 4.0, 3.5, 3.0, 2.5, 2.0, 1.5, 1.0, 0.8, 0.5, 0.4, 0.3, 0.2, 0.1, or 0.

As used herein, "non-volatile components" are the fraction of the hydrocarbon feed with a nominal boiling point of at least 590° C. (1100° F.) as measured by ASTM D-6352-98 or D-2887. The boiling point distribution of the hydrocarbon feed is measured by Gas Chromatograph Distillation (GCD) by ASTM D-6352-98 or D-2887. Non-volatiles include coke precursors, which are large, condensable molecules that condense in the vapor and then form coke under the operating conditions encountered in the present process of the invention.

"Olefin product" means a product comprising an olefin, preferably a product consisting essentially of an olefin. An olefin product in the meaning of this disclosure can be, e.g., an ethylene stream, a propylene stream, an ethylene/propylene mixture stream, a butylenes stream, and the like.

"Resid" as used herein refers to the bottoms cut of a crude distillation process that contains non-volatile components. Resids are complex mixture of heavy petroleum compounds otherwise known in the art as residuum or residual. Atmospheric resid is the bottoms product produced from atmospheric distillation of crude where a typical endpoint of the heaviest distilled product is nominally 650° F. (343° C.), and is referred to as 650° F. (343° C.) resid. The term "nominally" herein means that reasonable experts may disagree on the exact cut point for these terms, but by no more than +/−100° F. (+/−55.6° C.) preferably no more than +/−50° F. (+/−27.8° C.). Vacuum resid is the bottoms product from a distillation column operated under vacuum where the heaviest distilled product can be nominally 1050° F. (566° C.), and is referred to as 1050° F. (566° C.) resid.

The term "theoretical stage," "theoretical distillation stage," "theoretical plate," "ideal equilibrium stage," and "ideal stage" are interchangeably used herein to mean a stage which has the exit phases/streams in thermodynamic equilibrium. The value of theoretical stage of a given section in a given distillation column can be determined using conventional techniques, including bottoms liquid sampling followed by any technique for measuring the bottoms boiling curve, e.g., the methods outlined in ASTM Standard D-2887.

An "upper effluent" as used herein may be at the very top or the side of a vessel such as a drum, a fractionation column or a reactor, with or without an additional effluent above it. Preferably, an upper effluent is drawn at a location in the vicinity of the top of the column. Preferably, an upper effluent is drawn at a location above at least one feed. A "lower effluent" as used herein is at a location lower than the upper effluent, which may be at the very bottom or the side of a vessel, and if at the side, with or without additional effluent below it. Preferably, a lower effluent is drawn at a location in the vicinity of the bottom of the column. Preferably, a lower effluent is drawn at a location below at least one feed. As used herein, a "middle effluent" is an effluent between an upper effluent and a lower effluent. An "overhead effluent" is an upper effluent drawn in the vicinity of the top of a vessel such as a distillation column, preferably from the top. A "bottoms effluent" is a lower effluent drawn in the vicinity of the bottom of a vessel such as a distillation column, preferably from the bottom.

As used herein, "wt %" means percentage by weight, "vol %" means percentage by volume, "mol %" means percentage by mole, "ppm" means parts per million, and "ppm wt" and "wppm" are used interchangeably to mean parts per million on a weight basis. All concentrations herein are expressed on the basis of the total amount of the composition in question. Thus, the concentrations of the various components of the "petroleum feed" are expressed based on the total weight of the petroleum feed. All ranges expressed herein should include both end points as two specific embodiments unless specified or indicated to the contrary.

Nomenclature of elements and groups thereof used herein are pursuant to the Periodic Table used by the International Union of Pure and Applied Chemistry after 1988. An example of the Periodic Table is shown in the inner page of the front cover of Advanced Inorganic Chemistry, 6th Edition, by F. Albert Cotton et al. (John Wiley & Sons, Inc., 1999).

This disclosure relates to process and system for processing a petroleum feed such as crude oil for making various chemical products and fuel products, including but not limited to one or more hydrogen, methane, ethylene, propylene, gasoline, distillate, and the like. The process and system utilize a flashing drum to separate the petroleum feed to obtain an overhead vapor stream and a liquid bottoms effluent. At least a portion of the liquid bottoms effluent is then fed into a first cracker such as a fluid coker or an oxidative cracker, where at least a portion of the bottoms hydrocarbons are cracked to form a first cracker product mixture comprising olefins. The first cracker product mixture is then immediately cooled down by quenching and/or indirect cooling. At least a portion of the cooled first cracker product mixture can be fed into an olefin-to-gasoline ("OTG") reaction zone where a portion of the olefins can be converted into gasoline. The OTG product mixture exiting the OTG reaction zone can be separated to obtain one or more of the following chemical and fuel products: hydrogen, C2-C4 hydrocarbons, gasoline, distillate, and tar. The overhead stream from the flashing drum can be partly used, after optional cooling, as a quenching stream for directly cooling down the first cracker product mixture existing the first cracker. At least a portion of the overhead stream from the flashing drum can be fed into a steam cracker, where it is cracked to form a steam cracker product mixture. Upon immediate quenching and/or cooling, the steam cracker product mixture can be separated to obtain a steam cracker tar and lighter products. The lighter products can be combined with the C2-C4 hydrocarbon stream separated from the OTG product mixture, and then separated to recover one or more of: hydrogen, ethylene; propylene, butylenes, gasoline, distillate, and the like. The steam cracker tar and the tar separated from the first cracker product mixture can be combined, and hydrotreated using hydrogen recovered from the OTG reaction product mixture and/or the steam cracker product mixture. By varying the cut point of the liquid bottoms effluent from the flashing drum, one can conveniently vary the quantity and compositions of the liquid bottoms effluent and the overhead vapor stream, thereby varying the quantities of the various products produced by the overall system to suit the needs of the petroleum feed and/or the needs of the markets for these products. Thus, the process and system of this disclosure can be regarded as a flexible chemical and/or fuel products manufacturing facility from crude oil. Notably, by utilizing a first cracker such as a fluid coker to crack the bottoms hydrocarbon from the flashing drum, the process and system of this disclosure can produce more valuable light hydrocarbons such as C2-C4 olefins than conventional crude refinery/chemical complexes where the bottoms hydrocarbons are typically fractionated to primarily make fuel products. By including an OTG reaction zone, the process and system of this disclosure can convert a portion of the olefins produced in the first cracker into gasoline range hydrocarbons, which can be separated to make fuel products.

The Petroleum Feed

A typical crude comprising a mixture of hydrocarbons with varying carbon numbers and boiling points. Thus, by using conventional atmospheric distillation and vacuum distillation, one can produce a range of fuel products with varying boiling points: naphtha, gasoline, kerosene, distillate, and tar. It is highly desired, however, to convert the large hydrocarbon molecules contained in the crude into more valuable, lighter chemicals including but not limited to ethylene, propylene, butylenes, and the like, which can be further made into more valuable products such as polyethylene, polypropylene, ethylene-propylene copolymers, butyl rubbers, and the like. The present disclosure satisfies this need.

The petroleum feed useful for the process and system of this disclosure can be any crude or any mixture thereof, any crude fraction or any mixture thereof, and any mixture of any crude with any crude fraction. A preferred petroleum feed is a crude or mixture thereof. The petroleum feed may comprise a non-volatile component. It is contemplated that the following may be used as at a portion of the petroleum feed: atmospheric resid, vacuum resid, steam cracked gas oil and residue, gas oil, heating oil, hydrocrackate, atmospheric pipestill bottoms, vacuum pipestill streams including bottoms, gas oil condensate, heavy non-virgin hydrocarbon stream from refineries, vacuum gas oil, heavy gas oil, naphtha contaminated with crude, heavy residue, C4's/residue admixture, naphtha/residue admixture, hydrocarbon gases/residue admixture, hydrogen/residue admixture, gas oil/residue admixture. Non-limiting examples of crudes useful as the petroleum feed include, but are not limited to: Tapis, Murban, Arab Light, Arab Mediuim or Arab Heavy as examples.

The Flashing Drum And Operation Thereof

The petroleum feed may be fed into the flashing drum via a single inlet or multiple inlets from a single source (e.g., a storage tank). Alternatively, multiple streams of petroleum feeds having differing compositions from multiple sources (e.g., a crude stream, a 343° C. resid stream from an atmospheric distillation column, and a vacuum gas oil stream from a vacuum distillation column) may be fed into the flashing drum via a common shared inlet or multiple, separate inlets. In the latter case, the multiple inlets may be situated at the same or differing heights from the bottom on the flashing drum. In the disclosure below, for the convenience of description, the "petroleum feed" should be understood to mean the aggregate of all petroleum feed streams supplied to the flashing drum, unless specified otherwise or the context of the description clearly indicates otherwise.

Preferably the inlet through which the petroleum feed is supplied into the flashing drum is located in the vicinity of the bottom of the flashing drum to prevent heavy components from entering into the vapor overhead effluent, which can cause fouling of the downstream pyrolysis furnace cracker.

The petroleum feed can be at a temperature within a broad range when entering the flashing drum, depending on factors such as the source, composition, the concentration of resids, and the like. When entering the flashing drum, the petroleum feed preferably has an inlet temperature in a range from $T1$ to $T2°$ C., where $T1$ and $T2$ can be, independently, 300, 320, 340, 343, 350, 360, 380, 400, 420, or 450, as long as $T1 < T2$, especially if only crude or crude mixtures is supplied as the petroleum feed to the flashing drum. Depending on the source of the specific petroleum feed stream and source temperature, the feed stream may be advantageously heated or cooled to the desirable temperature by other streams supplied or generated in the same facility, particularly in the same process of this disclosure, to maximize energy efficiency, by using one or more heat exchangers. In a specific embodiment, the petroleum feed, or a portion thereof, may be heated in a tube winding located within the furnace of a pyrolysis furnace cracker described below. In another specific embodiment, the petroleum feed, or a portion thereof, may be heated by directly combining with a stream with a higher temperature, such as a dilute steam stream (e.g., a super-heated steam stream) or a stripping vapor stream described below.

A dilute steam stream and/or a stripping vapor stream can be optionally fed into the flashing drum to facilitate the separation of the components.

The one or more stripping vapor stream(s) can have the same or differing compositions. Any given stripping vapor stream can be, e.g., a hydrogen stream, a steam stream, a light hydrocarbon stream (e.g., a saturated C2-C3 hydrocarbon stream), an inert gas (e.g., nitrogen, noble gases) stream, or mixtures thereof (e.g., a hydrogen/methane mixture stream, a steam/light hydrocarbon mixture stream, a hydrogen/steam mixture stream, a hydrogen/steam/light hydrocarbon mixture stream). A single second inlet may be used for supplying one or more of hydrogen, steam, light hydrocarbons, an inert gas, or any mixture thereof, as the only stripping vapor stream into the first striping column. Alternatively, multiple second inlets may be used for supplying identical hydrogen streams, steam streams, light hydrocarbon streams, inert gases, or identical mixture streams of hydrogen and/or steam and/or light hydrocarbon(s) and inert gases, into the flashing drum. Still alternatively, multiple second inlets may be used for supplying differing stripping vapor streams (e.g., hydrogen stream(s), steam stream(s), light hydrocarbon stream(s), and mixtures thereof) into the flashing drum. In one embodiment, a steam stream is supplied to the flashing drum at a first location in the vicinity of the bottom of the column, and a light hydrocarbon stream is supplied to the column at a second location above the first location below the inlet(s). A stripping vapor stream may be combined with a petroleum feed stream before being fed into the flashing drum. In one specific exemplary example, a dilute steam stream can be combined with a petroleum feed stream before being supplied into the flashing drum as a mixed stream.

Where a light hydrocarbon vapor is supplied to the flashing drum either as a stand-alone stripping vapor stream, or as a portion of a mixture with other stripping vapor(s) such as hydrogen and/or steam, or as a portion of a mixture with an petroleum feed stream, such light hydrocarbon stream preferably consists essentially of C1-C5 hydrocarbons, more preferably C2-C5 hydrocarbons, still more preferably C2-C4 hydrocarbons, and still more preferably C2-C3 hydrocarbons. Such light hydrocarbon vapor preferably consists essentially of saturated C1-C5 hydrocarbons, still more preferably saturated C2-C5 hydrocarbons, still more preferably saturated C2-C4 hydrocarbons, still more preferably saturated C2-C3 hydrocarbons. Preferably, such saturated hydrocarbons are produced in the cracked products recovery zone downstream of the pyrolysis furnace cracker. Owing to their small molecules, substantial molar quantities of such light hydrocarbons can be supplied into the flashing drum even at a small weight percentage of the heavy petroleum feed. The saturated light hydrocarbon vapor form a portion of the vapor overhead effluent, at least a portion of which enters the downstream pyrolysis furnace cracker, where they can be desirably readily cracked to form light olefins such as ethylene, propene, butylenes, and the like, which can be highly valuable olefin products recoverable from the cracked products recovery zone. Where a saturated light hydrocarbon stream recovered from the cracked products recovery zone is recycled to the flashing drum as a deep stripping vapor stream or a portion thereof, the yield of olefin products can be significantly enhanced. The weight of light hydrocarbons (e.g., saturated C2-C3 hydrocarbons) introduced into the flashing drum as the stripping vapor stream or a portion thereof can range from 0 to 30 wt %, e.g., 0.01 to 25 wt %, or 0.1 to 20 wt %, or 0.5 to 15 wt %, or 1 to 10 wt %, or 2 to 8 wt %, or 3 to 6 wt %, or 4 to 5 wt %, of the total weight of the petroleum feed introduced into the flashing drum.

Hydrogen can be used in addition or alternatively to the light hydrocarbon stream in the stripping vapor stream(s) supplied to the flashing drum. Such hydrogen can be sourced from, e.g., the cracked products recovery zone following the pyrolysis furnace cracker in the process of this disclosure. The hydrogen fed into the flashing drum as a stripping vapor can be a high-purity hydrogen stream, or a portion of a hydrogen/light hydrocarbon mixture stream such as a hydrogen/methane mixture stream. Feeding rate of hydrogen can range from 0 to 1.5 wt %, e.g., from 0.001 to 1.5 wt %, or from 0.1 to 1.5 wt %, or from 0.2 to 0.8 wt %, of the total weight of the petroleum feed.

Steam can be used in addition or alternatively to the light hydrocarbon stream in the stripping vapor stream(s) supplied to the flashing drum. Such steam can be sourced from a boiler, from a superheated steam source available in the facility, or from a heat exchanger where water is heated by a hot effluent in need of cooling in the same facility, e.g., a hot stream generated in the process of this disclosure, to improve energy efficiency. Feeding rate of steam into the flashing drum can range from w1 to w2 wt % of the total weight of the petroleum feed, where w1 and w2 can be, independently, 0, 1, 2, 3, 4, 5, 6, 7, 8, 9, 10, 15, 20, 25, 30, 35, 40, 45, 50, 55, 60, 65, 70, 75, 80, as long as w1<w2. Preferably w1=10 and w2=50. More preferably w1=20 and w2=60. Still more preferably w1=30 and w2=50, especially if steam is the predominant stripping vapor component in order to achieve deep stripping of the petroleum feed in the flashing drum.

Where light hydrocarbon(s) and steam are both fed to the flashing drum as separate streams or mixture stream(s), the ratio of the total moles of the light hydrocarbon(s) to the total moles of steam fed into the flashing drum can range from r1 to r2, where r1 and r2 can be, independently, 0.01, 0.02, 0.03, 0.04, 0.05, 0.06, 0.07, 0.08, 0.09, 0.10, 0.20, 0.30, 0.40, 0.50, 0.60, 0.70, 0.80, 0.90, 1.0, 2.0, 3.0, 4.0, 5.0, 6.0, 7.0, 8.0, 9.0, 10, 20, 30, 40, 50, 60, 70, 80, 90, 100, as long as r1<r2.

Although it is possible that the stripping vapor stream(s) can have a temperature lower than one or more of the petroleum feed stream(s), the temperature of the stripping vapor stream(s) supplied into the flashing drum is preferably not lower than the temperature of the petroleum feed stream(s) entering the column. Preferably, the temperature of the stripping vapor stream(s) entering the flashing drum is higher than the lowest temperature of the petroleum feed stream(s) entering the column by deltaT° C., where deltaT can be, independently, 0, 10, 20, 30, 40, 50, 60, 70, 80, 90, 100, 120, 140, 150, 160, 180, 200. A higher temperature stripping vapor can provide at least a portion of the heat required for vaporizing the light components contained in the petroleum feed facilitating the formation and separation of the first overheads effluent from the column.

The pressure of the stripping vapor stream(s) is preferably higher than atmospheric pressure when entering the flashing drum. Thus, in preferred embodiments, the absolute pressure of the stripping vapor stream(s) when entering the flashing drum ranges from p1 to p2 kilopascal ("kPa"), where p1 and p2 can be, independently, 102, 105, 110, 120, 130, 140, 150, 160, 170, 180, 190, 200, 203, 210, 220, 230, 240, 250, 260, 270, 280, 290, 300, 304, 310, 350, 400, 405, 450, 500, 507, 600, 700, 800, 900, 1000, 1100, 1200, 1300, 1400, 1500, 1600, 1700, 1800, 1900, or 2000, as long as p1<p2. The relatively high pressure of the stripping vapor stream entering the flashing drum can help to ensure that column operates with an overhead pressure higher than atmospheric pressure, which facilitates the delivery of the vapor overhead effluent to the next step and prevents undesirable air ingress into the column.

In one embodiment, the flashing drum is operated at an absolute internal pressure (i.e., the pressure at the top of the column) from 280 to 1850 kPa pressure and its temperature is similar to or slightly lower than the temperature of the petroleum feed stream when entering the flashing drum. For example, the pressure at which the flashing drum operates can be from 275 to 1400 kPa (40 to 200 psia) and the temperature can be from 300 to 540° C. (572 to 1000° F.). For example, the pressure of the flashing drum can be from 600 to 1100 kPa (85 to 155 psia) and the temperature can be 370 to 490° C. (700 to 920° F.). As a further example, the pressure at the top of the flashing drum can be 700 to 1000 kPa (105 to 145 psia) with a temperature of 400 to 480° C. (750 to 900° F.). In yet another example, the pressure of the flashing drum can be 700 to 760 kPa (105 to 125 psia) and the temperature can be 430 to 475° C. (810 to 890° F.).

Upon entering the flashing drum, the stripping vapor(s) travel upwards in the column, mix with petroleum feed material(s), free a portion of the light fractions in the petroleum feed material(s), and exit the column together with light fractions from the petroleum feed material(s) as a portion of the vapor overhead effluent. The aggregate quantity of the stripping vapors supplied into flashing drum can vary widely depending on, among others, the composition of the petroleum feed introduced into the column. For example, the aggregate feeding rate of stripping vapor(s) to the flashing drum can be from ra to rb mol %, based on the total moles of the molecules present in the vapor overhead effluent, where ra and rb can be, independently, 1, 2, 4 5, 8, 10, 15, 20, 25, 30, 35, 40, 45, 50, 55, or 60, as long as ra <rb. For another example, the aggregate feeding rate of the stripping vapor(s) to the flashing drum can be from rc to rd wt % into the flashing drum, based on the total weight of the petroleum feed supplied into the column, where rc and rd can be, independently, 1, 2, 3, 4, 5, 6, 7, 8, 9, 10, 15, 20, 25, 30, 35, 40, 45, 50, 55, or 60, as long as rc <rd. Preferably rc=30 and rd =50.

To effect the separation of the petroleum feed in the flashing drum to obtain the liquid bottoms effluent and the vapor overhead effluent, internal separation structure inside the flashing drum to provide liquid-vapor contact surface may be used. For example, below the location of the inlet through which the petroleum feed is introduced into the flashing drum, a first separation structure providing at least one theoretical distillation stage of separation is installed. Preferably, the first separation structure below the inlet provides no more than four theoretical distillation stages of separation.

The separation structure provided in the flashing drum can be any conventional separation structure such as sieve tray, bubble cap tray, packing materials, and the like, and combinations thereof. Exemplary commercial separation structures are Glitsch Grid products, e.g., FLEXIGRID®-2, FLEXIGRID®-3, FLEXIGRID®-4, and FLEXIGRID®-5, available from Koch-Glitsch, Inc., Wichita, Kans., USA, and other distillation tower wide open packing can be conveniently used to construct the first separation structure.

In another embodiment of the present disclosure, at least a portion of the gas-liquid contact surface is provided by one or more distillation tray comprising (a) a bottom which comprises at least one passage for admitting vapor upward to the tray and (b) a weir over which liquid can spill, extending from and above the bottom. The distillation tray can be associated with a downcomer extending beneath the tray for directing liquid spilled over the weir, the downcomer typically being a downward extension of the weir. The downcomer can extend to a level at or below the liquid level in the lower portion of the flashing drum. The bottom of the distillation tray comprises a means for permitting the passage of vapor from the bottom of the boot to pass into the tray, e.g., by using perforations, bubble caps, valve tray openings, and/or jet tray openings.

If stripping in the flashing drum is performed, the liquid bottoms effluent can have a higher minimal boiling point compared to a flashing drum without stripping at all. For example, the liquid bottoms effluent produced from the flashing drum can a minimal boiling point in the range from 350 to 600° C., preferably from 350 to 550° C., more preferably from 350 to 500° C., still more preferably from 371 to 482° C. (700 to 900° F.). To maintain the desirable temperature of the bottoms liquid, the flashing drum may be equipped with a reboiler or heat exchanger and a recycle loop, to heat or cool the bottoms liquid.

While it is generally preferred that the liquid bottoms effluent has such a high minimal boiling point described in the preceding paragraphs, it is contemplated that in an alternate embodiment, the flashing drum may be operated such that the liquid bottoms effluent comprises vacuum gas oil at a relatively high concentration.

The vapor overhead effluent produced from the flashing drum comprises a mixture of the optional stripping vapor (if used) and hydrocarbons having boiling points lower than those in the liquid bottoms effluent. The vapor overhead effluent at the outlet of the flashing drum can have a final boiling temperature of at least 300° C., e.g., in a range from t3 to t4° C., where t3 and t4 can be, independently, 300, 325, 350, 375, 400, 425, 450, 475, 500, 525, 550, 575, 600, as long as t3<t4.

Depending on the composition of the petroleum feed, the vapor overhead effluent can comprise a gas oil fraction and hydrocarbons lighter than the vacuum gas oil fraction. In one embodiment, one can cool down the vapor overhead effluent upon its leaving the flashing drum via a heat exchanger to obtain a mixture of liquid and vapor, which can be separated in a separation drum to obtain a gas oil liquid stream and a residual vapor stream. The gas oil liquid stream can be used for fuel gas blending or fed to a cracker such as a fluid catalytic cracker or a pyrolysis furnace cracker to be converted into lighter hydrocarbons rich in olefins. The residual vapor stream can be optionally further heated or cooled to the desirable temperature before being fed into a downstream steam cracker, where it is converted into lighter hydrocarbons rich in olefins. In another embodiment, the vapor overhead effluent produced from the flashing drum can be, after optional additional heating or cooling, fed into a pyrolysis furnace cracker directly without intermediate separation, where it is converted into lighter hydrocarbons rich in olefins.

In one specific embodiment, the flashing drum can take the form of a vertical flashing drum equipped with a boot similar to the flashing drums described in WO2005/113,717 A2 and U.S. Pat. No. 7,235,705 B2, the relevant contents therein are incorporated by reference in their entirety.

The First Cracker and Operation Thereof

At least a portion of the bottoms effluent exiting the flashing drum is then, after optional heating or cooling, fed into the first cracker via a first inlet on the first cracker. The first cracker can be operated under a first set of cracking conditions to produce a first cracker product mixture exiting the first cracker. At least a portion of the bottoms hydrocarbons contained in the bottoms effluent undergoes pyrolysis and are converted to lighter hydrocarbons comprising olefins (alkenes) and/or alkynes.

Since the bottoms effluent can comprise non-volatiles (especially if a crude is used as at least a portion of the petroleum feed to the flashing drum), which can foul a conventional steam cracker, the first cracker is preferably not a steam cracker described below in this disclosure. In the first cracker, at least a portion of the bottoms hydrocarbons can be heated to pyrolysis temperature and conditions via, e.g., direct combustion of a portion of the bottoms effluent, combustion of an externally supplied material, and/or contacting a heat carrier having a high temperature. Exemplary first crackers are fluidized bed coker and oxidation cracker.

A fluidized bed coker ("FBC"), also called a fluid coker, utilizes a fluidized bed of solid particles as heat transfer media to effect pyrolysis of hydrocarbons. An FBC has a reaction chamber equipped with the first inlet for the bottoms effluent from the flashing drum, a second inlet for receiving a plurality of solid particles carried by a hot gas stream, and an outlet for discharging the first cracker product mixture. Such solid particles can be, e.g., carbon particles (e.g., coke particles), alumina, silica, titania, yttria, zirconia, zircon, and other refractory materials, and mixtures, combinations and compounds thereof, fluidized by the carrier gas in the reaction chamber of the FBC. A FBC resembles a fluid bed catalytic converter ("FCC") used for converting aliphatic hydrocarbons to aromatic hydrocarbons. However, a FBC operates the fluid bed of solid particles at far higher temperature than FCC to impart pyrolysis of the hydrocarbons. In an FCC, hydrocarbon molecules typically do not undergo pyrolysis.

On contacting the bottoms hydrocarbons in the reaction chamber, the solid particles transfer heat to the bottoms hydrocarbons, heat a plurality of them to an elevated temperature to effect the pyrolysis of the bottoms hydrocarbons. The FBC is desirably equipped with means for capturing the solid particles (e.g., high efficiency cyclone(s)), regenerating at least a portion of them in a regenerator, and recycling the regenerated particles to the reaction chamber.

During regeneration, residual hydrocarbon such as coke on the particles can be oxidized to provide heat to raise the particle temperature. Additional fuel may be combusted to heat the particles to the needed pyrolysis temperature before they are supplied to the first cracker. Where the particles are carbon particles, the particles can be partially combusted in the regenerator to provide the needed energy to elevate their temperature required to initiate pyrolysis of the bottoms hydrocarbons.

The carrier gas fluidizing the solid particles can be non-oxidative and substantially free of molecular oxygen. Alternatively, the carrier gas can contain molecular oxygen at a given amount. Such high-temperature oxygen, on contact with the bottoms hydrocarbons, can combust a portion of the bottoms hydrocarbons to provide heat energy to further heat the solid particles to the desired temperature required to effect pyrolysis of the bottoms hydrocarbons. Where the solid particles comprise carbon (e.g., coke), a portion of the solid particles may be combusted in the reaction chamber to provide the heat to raise the particle temperature as well.

The quantity of molecular oxygen in the carrier gas supplied into the FBC should be controlled such that excessive combustion and oxidation of the bottoms hydrocarbon does not occur.

When using a FBC, it is highly desirable the first inlet on the FBC for receiving the bottoms effluent is located in the vicinity of the top of the fluidized bed of the solid particles. In one embodiment, the top of the fluidized bed of the solid particles has a temperature in the range from 593 to 1200° C. (1100 to 2192° F.) and an absolute pressure in the range from 100 to 1825 kilopascal (from near atmospheric pressure to 250 psi gauge).

U.S. Pat. Nos. 3,671,424 and 8,361,311 describe exemplary fluid cokers and operation thereof, the contents of both of which are incorporated herein by reference in their entirety.

The first cracker product mixture exiting a FBC typically comprises olefins such as ethylene and propylene. Owing to the temperature of operation, alkynes, if any, tend to be a minor component in the FBC cracker product mixture.

Another type cracker useful as the first cracker in the process and system of this disclosure is an oxidative cracker, such as the reactor described in U.S. Pat. No. 6,365,792, the content of which is incorporated herein by reference in its entirety. In a process utilizing oxidative cracking, the bottoms effluent together with molecular oxygen (such as air) and/or an oxygen-containing compounds (e.g., steam) are fed into the cracker to form a mixture. The mixture is heated to a temperature higher than 1000° C. but no higher than 1400° C. for a residence time of at least 10 milliseconds in the reactor. Due to the high reaction temperature, the first cracker product mixture exiting the oxidative cracker tends to comprise alkynes such as acetylene at higher concentration that the first cracker product mixture produced by a FBC. In certain embodiments, the first cracker product mixture from an oxidative cracker can comprise acetylene as the primary product.

The Quenching Zone

The first cracker product mixture exiting the first cracker has a high temperature and comprises many reactive species. It is highly desirable that the first cracker product mixture is cooled immediately after it exits the first cracker, to a sufficient low temperature in a very short period of time such that the reactive species do not recombine to form large molecules, or the olefins and alkynes do not become saturated to form alkanes during the cooling process. Thus, a preferred method of fast cooling is by injecting a quenching stream into the first cracker product mixture in a quenching zone immediately after it exits the first cracker reaction zone. Any suitable oil having a low temperature capable of reducing the temperature of the first cracker product mixture to a desirable level may be used. In a preferred embodiment, a portion of the vapor overhead effluent exiting the flashing drum, optionally cooled further via a heat exchanger, may be injected into the quenching zone to combine with the first cracker product mixture to form a mixture having a temperature substantially lower than the first cracker product mixture at the outlet.

The Indirect Cooling Zone

Alternatively or additionally, the first cracker product mixture may be indirectly cooled by using a heat exchanger immediately after the first cracker product mixture exits the first cracker, or after the quenching zone.

The thus cooled first cracker product mixture can comprise one or more of the following, among others: hydrogen, methane, ethylene, propylene, butenes, acetylene (especially if an oxidative cracker is used), oxygenates (e.g., CO, $CO_2$, and steam, if molecular oxygen or an oxygen-containing compound is fed into the first cracker), naphtha, gas oil, vacuum gas oil, and tar.

The Olefin-to-Gasoline Reaction Zone

At least a portion of first cracker product mixture, upon quenching and/or indirect cooling, can be fed into an olefin-to-gasoline ("OTG") reaction zone, where a portion of the olefins in the first cracker product mixture can oligomerize in the presence of an OTG catalyst to produce gasoline and/or distillate boiling range hydrocarbons. Exemplary OTG reactor, OTG catalysts, and operation conditions are described in, e.g., U.S. Pat. No. 5,043,499 and WO1993/002025A1, the contents of which are incorporated herein by reference in their entirety.

The admixture entering the OTG reaction can have a temperature in the range, e.g., from 260 to 816° C. (500 to 1500° F.).

Oligomerization catalysts preferred for use in the OTG reaction zone include the medium pore shape selective crystalline aluminosilicate zeolites having a silica:alumina molar ratio of at least 12, a constraint index of 1 to 12 and acid cracking activity of 1 to 250. ZSM-5 type zeolites are particularly advantageous. Representative of the ZSM-5 type zeolites are ZSM-5, ZSM-11, ZSM-12, ZSM-22, ZSM-23, ZSM-35 and ZSM-48. ZSM-5 is disclosed in U.S. Pat. No. 3,702,886 and U.S. Pat. No. Re. 29,948. Other suitable zeolites are disclosed in U.S. Pat. Nos. 3,709,979; 3,832,449; 4,076,979; 3,832,449; 4,076,842; 4,016,245; 4,046,839; 4,414,423 and 4,417,086. A useful OTC catalyst may consist essentially of a ZSM-5 type zeolite with 5 to 95 wt % silica and/or alumina binder.

The OTG zone can include a fluidized bed of the OTG catalyst particles, a regenerator for combusting and regenerating a portion of the OTG catalyst particles, and cyclones for collecting the OTG catalyst particles.

The effluent exiting the OTG reaction zone therefore can comprise, among others: hydrogen, methane, ethylene, propylene, butenes, acetylene (especially if an oxidative cracker is used), oxygenates (e.g., CO, $CO_2$, and steam, if molecular oxygen or an oxygen-containing compound is fed into the first cracker), naphtha, gas oil, vacuum gas oil, and tar. Compared to the mixture entering into the OTG reaction zone, the effluent exiting the OTG reaction zone has a higher concentrations of gas oil and vacuum gas oil, and a lower concentration of ethylene. Separation and Recovery of Products from Effluents Exiting the OTG Reaction Zone The various components in the effluent exiting the OTG reaction zone can be separated and recovered in a product recovery zone. For example, tar in the effluent can be first separated from the lighter fraction and combined with tar separated from the product mixture effluent from any steam cracker (described below), and processed together. One way to process tar is hydrotreating to obtain high-quality, low-sulfur distillate range hydrocarbons useful for fuel blending. The lighter fraction can be separated to obtain one or more of a hydrogen-containing stream, a C2-C4 stream, a gasoline stream, and a distillate stream. The gasoline stream and the distillate stream may be used for fuel blending. A pure hydrogen stream may be produced from the lighter fraction and fed to the hydrotreater to process tar.

The Steam Cracker

A pyrolysis furnace cracker is a reactor for converting hydrocarbons by subjecting the hydrocarbon molecules to high temperature where larger hydrocarbon molecules break to form smaller hydrocarbon molecules rich in unsaturated hydrocarbons and hydrogen. Pyrolysis furnace crackers include, but are not limited to, steam crackers.

A steam cracker is a pyrolysis furnace cracker that has two main sections: a convection section and a radiant section, where hydrocarbon feedstock enters the less severe convection section of the furnace as a liquid, vapor, or liquid/vapor mixture and where the feedstock is heated and vaporized by indirect contact with hot flue gas from the radiant section and optionally by direct contact with steam to an intermediate temperature. The vaporized feedstock and steam mixture (if present) is then introduced (typically through cross-over piping) into the radiant section where it is quickly heated, at pressures typically ranging from 10 to 50 psig (69 to 345 kPa gauge), to a severe hydrocarbon cracking temperature, such as in the range of from 1450° F. (788° C.) to 1650° F. (900° C.), to provide thermal cracking of the hydrocarbon molecules in the feed stream. The resulting stream cracker product mixture exiting the stream cracker is typically immediately quenched to stop further reactions and then separated in a recovery zone to obtain various fractions including hydrogen/methane, C2-C3 paraffins, ethylene, propylene, C4 olefins, C5 olefins, single-ring aromatic products, fuel oil, tar, and non-aromatic SCN (steam cracked naphtha), and the like. Description of structure and operation of stream crackers can be found in, e.g., U.S. Pat. Nos. 3,365,387, 5,580,443, 7,244,871, 7,138,047, and U.S. Patent Application Publication No. 2005/0209495 A1, the contents of which are incorporated by reference herein in their entirety.

The vapor overhead effluent from the flashing drum can comprise, e.g., naphtha, light gas oil, and steam (if steam stripping is used in the flashing drum). At least a portion of the vapor overhead effluent exiting the flashing drum in the process of this disclosure may be fed into a steam cracker to be converted into more valuable chemical products such as ethylene, propylene, butylenes, and the like.

In the process of this disclosure, one can further introduce a steam stream ("cracker bypass steam stream") into the steam cracker at a location upstream of the radiant zone to further heat the materials inside the cracker tubing and/or to dilute the materials.

In one embodiment, the overhead effluent from the flashing drum may contain, for example, 55 to 90% hydrocarbons and 10 to 45% steam. The overhead effluent is continuously removed from the flashing drum through an overhead pipe, which optionally conveys the vapor to a centrifugal separator to remove trace amounts of entrained and/or condensed liquid. The overhead effluent stream continuously removed from the flashing drum can be superheated in pyrolysis furnace convection section to a temperature of, for example, about 425 to about 705° C. (800 to about 1300° F.) by the flue gas from the radiant section of the furnace. The overhead effluent is then introduced to the radiant section of the pyrolysis furnace to be cracked. The overhead effluent stream removed from the flashing drum can optionally be mixed with a cracker bypass steam stream before being introduced into the furnace convection section.

One or more of the hydrogen, methane, C2-C3 paraffins fractions recovered from the stream cracker product mixture can be partially recycled to the flashing drum as a stripping vapor stream or a portion thereof, as described above. Among these, recycling C2-C3 paraffins into the flashing drum as a stripping vapor can be particularly advantageous. The recycled C2-C3 paraffins form a part of the overhead effluent and is subsequently fed into the pyrolysis furnace cracker, where it is cracked to form valuable olefins. Alternatively, a portion of the C2-C3 paraffins can be fed into a dedicated steam cracker where they are converted into ethylene, propylene, hydrogen, and other byproducts.

Description of equipment and processes for recovering fractions in the stream cracker product mixture can be found in, e.g., U.S. Pat. Nos. 5,365,011A, 5,785,739A, U.S. Patent Application Publication No. 2012/0024749A1, and the like, the contents of which are incorporated herein by reference in their entirety. At least a portion of the stream cracker product mixture (e.g., a C2-C4 hydrocarbon stream) can be combined with at least a portion of the first cracker product mixture (e.g., a C2-C4 hydrocarbon stream), which is then separated and processed to recover one or more products such as hydrogen, hydrogen/methane mixture, ethylene, propylene, butylenes, naptha, gas oil, and the like.

As can be seen, by adjusting the cutpoint of the bottoms effluent exiting the flashing drum, one can adjust the quantity and compositions of the vapor overhead effluent and the bottoms effluent. As such, the quantities of olefins, naphtha, gas oil, and tar produced from the steam cracker, the first cracker/OTG, and the overall process change accordingly. Thus, the process/system of this disclosure can be used to flexibly produce a series of chemical products and fuel products from the same or different petroleum feed to suit the fluctuating market needs.

This disclosure is further illustrated by the following non-limiting example.

EXAMPLE

FIG. 1 schematically illustrates a process and system 101 of this disclosure for processing a petroleum feed such as a crude oil feed stream 103 to produce a variety of products. Feed stream 103 is first fed into a flashing drum 105, where an overhead vapor stream 109 and a heavy, liquid, bottoms stream 107 are produced. Preferably the cut point for the liquid bottoms stream 107 is from 370 to 490° C. The bottoms stream 107 is then fed into a first cracker 113 through an inlet, which can be, e.g., a fluid coker or an oxidative cracker. As shown in FIG. 1, a molecular oxygen-containing stream 111 is also fed into the first cracker at a location lower than the inlet, preferably in the vicinity of the bottom of the vessel housing the first cracker. In one embodiment, a fluidized bed of hot solid particles is present in the first cracker 113, which has a temperature sufficiently high to cause pyrolysis of at least a portion of the hydrocarbons contained in the stream 107 introduced into the first cracker to produce lower, unsaturated hydrocarbons such as ethylene, propylene, butylenes, and the like. Preferably the inlet is located in the vicinity of the top of the fluidized bed of the solid particles, where the temperature of the bed is relatively low. A portion of the hydrocarbons introduced into the first cracker and/or a portion of the solid particles where the solid particles are combustible (e.g., coke particles), is combusted with the molecular oxygen introduced into the first cracker via stream 111, providing at least a portion of the thermal energy to heat the bed of solid particles to the desired temperature. A portion of the solid particles may be collected through a cyclone (now shown), sent to a regeneration vessel where hydrocarbon and coke deposited on the surface of the particles, and optionally a portion of the solid particles per se if combustible, are combusted in the presence of an molecular oxygen-containing atmosphere, to heat at least a portion of the solid particles to an elevated temperature, which are then fed into the first cracker 113 again. Where the solid particles are coke particles, the first cracker can be a fluid coker described earlier in this disclosure. Alternatively, in the case where the first coker is an oxidative cracker described earlier in this disclosure, a portion of the hydrocarbons introduced into the first cracker 113 in stream 107 is combusted on contact with the molecular oxygen introduced through stream 111 to heat at least a portion of the remainder of the hydrocarbons in the first cracker to an elevated temperature to effect pyrolysis thereof to produce lower, unsaturated hydrocarbons such as ethylene, propylene, butylenes, methane, hydrogen, and the like. Preferably, the first cracker and its operation conditions are chosen such that the first cracker product mixture exiting it comprises a substantial quantity of ethylene and/or propylene, e.g., at least 30 wt %, 35 wt %, 40 wt %, 45 wt %, 50 wt %, 55 wt %, 60 wt %, 65 wt 5%, 70 wt %, or even 75 wt %, of ethylene and/or acetylene, or ethylene, acetylene, and propylene combined, or ethylene, acetylene, propylene, and butylene combined, based on the total weight of the first cracker product mixture. The first cracker product mixture also comprises molecular hydrogen, methane, saturated C2-C5 hydrocarbons, and heavier hydrocarbons including tar.

It is highly desired that the first cracker mixture is cooled down quickly once it leaves the first cracker. To that end, the first cracker product mixture can be immediately directly cooled in a quenching zone 117 using a quenching stream 109b described below to stop reactions among the components in the first cracker product mixture Immediately after the quenching zone, the mixture can be further cooled down in an indirect cooling zone 119 comprising a heat exchanger. The cooling fluid used on the other side of the heat exchanger can be water to produce high pressure steam, which can be utilized in other process steps in the process of this disclosure or in other processes on the same premise. Alternatively, other streams in need of heating can be used to cool down the first cracker product mixture/quenching feed mixture. Desirably, upon exiting the indirect cooling zone 119, the mixture has a temperature in the range from 260 to 816° C. (500 to 1500° F.), preferably from 300 to 750° C., more preferably from 300 to 600° C., still more preferably from 300 to 500° C.

The thus cooled stream exiting the indirect cooling zone 119, rich in olefins, can be at least partly fed into an olefin-to-gasoline ("OTG") zone 121, where at least a portion of the olefins is converted into gasoline on contacting an OTG catalyst. The catalyst can be present in a fixed bed, a fluidized bed, or the like. Where a fluid catalyst bed is used, the solid catalyst particles is fluidized by the mixture in the OTG reaction zone. A portion of the OTG catalyst particles may be collected by one or more cyclones (not shown), sent to a regeneration vessel (now shown), where hydrocarbons and coke entrained on the particles are combusted in the presence of molecular oxygen, and the particles are heated and then sent into the OTG reaction zone again as regenerated catalyst.

As shown in FIG. 1, the first cracker 113, the quenching zone 117, the indirect cooling zone 119, and the OTG reaction zone 121 are housed inside a common vessel 123 in which the mixtures travel upwards. In this embodiment, by integrating two reactors and one or two cooling zones into a single vessel, one can achieve the conversion of a stream 107 comprising relatively heavy hydrocarbons into a mixture comprising hydrogen, olefins, methane, C2-C4 saturated hydrocarbons, naphtha, and the like, in a single vessel 123 with a relatively small footprint. Alternatively, the first cracker 113 and the OTG reaction zone can be housed in separate reaction vessels. In a preferred embodiment, the first cracker 113, the quenching zone 117, and the indirect cooling zone 119 are housed in a common vessel so that the first cracker product mixture is promptly cooled down to a desirable temperature to prevent reactions between components in the mixture at high temperature that otherwise can occur in the case of slow cooling. In another embodiment, the first cracker and the quenching zone are housed in the same vessel, and the indirect cooling zone is housed in a separate vessel immediately connected to the quenching zone via one or more short conduits. In embodiments where the quenching zone is absent, it is highly desirable that the indirect cooling zone and the first cracker are housed in the same vessel to effect fast indirect cooling of the first cracker product mixture.

As shown in FIG. 1, the OTG product mixture exits the integrated vessel 123 from the top as stream 125. Stream 125 is then fed to a first cracked product recovery zone 127, where it is separated to obtain a first gas stream 129 comprising C2-C4 hydrocarbons, CO2, and steam, a first naphtha stream 131, an optional distillate stream 133, and a first tar stream 135. The first gas stream 129 is fed into a first gas separation zone 141 to produce a hydrogen stream 143, a C2-C4 hydrocarbon stream 145, a fuel gas stream 146, and a CO2 stream 147. The CO2 stream 147 can be captured and disposed of to reduce CO2 released into the atmosphere. The C2-C4 hydrocarbon stream 145, rich in ethylene, propylene, and saturated C2-C4 hydrocarbons, can be sent to a second product recovery zone 155, where it is combined with stream 151 (described in greater detail below), and separated to obtain a hydrogen stream 157, a hydrogen/methane mixture stream 159, an ethylene stream 161, a propylene stream 163, a C4 hydrocarbon stream which can be further processed (now shown), and a naphtha stream 165.

As indicated above, a portion of the overhead vapor stream 109 produced from the flashing drum 105 can be optionally used (e.g., after optional cooling) as a quenching stream 109b fed into the quenching zone 117 after the first cracker 113. The overhead vapor stream 109 can also be, at least partly (stream 109a as shown in FIG. 1), sent to a steam cracker 149 where it is subjected to pyrolysis and converted into olefins such as ethylene, propylene and butylenes, C2-C4 saturated hydrocarbons, and the like. A steam cracker comprises a convection zone, where the hydrocarbon feed is fed to an intermediate temperature without substantial pyrolysis, and a radiant zone where the hydrocarbon feed is heated to a high temperature for a short residence time where pyrolysis of the hydrocarbons occurs. The steam cracker product mixture exiting the radiant zone is typically quenched immediately to stop further reactions among the components in the mixture. As shown in FIG. 1, from the steam cracker, a quenched stream 151 comprising light hydrocarbons and a second tar stream 152 are produced. Stream 151 is combined with stream 146 rich in C2-C4 hydrocarbons from the first gas separation zone 141 to form a mixture 153, which is separated/processed in a second product recovery zone 155 to obtain a hydrogen/methane mixture stream 157, an ethylene stream 159, a propylene stream 161, a C4 hydrocarbon stream 163, and a steam cracked naphtha stream 165.

As shown in FIG. 1, the first tar stream 135 produced from the first cracked product recovery zone 127 and the second tar stream 152 produced from the steam cracker 149, and a hydrogen stream 143 produced from the first gas separation zone 141 are fed into a hydrotreater 137. Such hydrotreating of tar can yield low-sulfur fuel such as gasoline and/or distillate products.

In the process illustrated in FIG. 1, one can conveniently adjust the cut point of the bottoms effluent 107 produced from the flashing drum 105 to achieve the desired quantity and compositions of the overhead effluent 109 and the bottoms effluent 107, and thereby altering the quantities of the variety of products: hydrogen, methane, ethylene, propylene, butylenes, naphtha, distillate, and the like.

What is claimed is:

1. A process for processing a petroleum feed to produce a plurality of hydrocarbon products, the process comprising:
   (I) feeding the petroleum feed to a flashing drum;
   (II) obtaining a liquid bottoms effluent comprising bottoms hydrocarbons and a vapor overhead effluent comprising overhead hydrocarbons from the flashing drum, wherein the bottoms hydrocarbons optionally comprise a non-volatile component;
   (III) feeding at least a portion of the bottoms effluent to a first cracker through a first inlet on the first cracker;
   (IV) converting at least a portion of the bottoms hydrocarbons under a first set of cracking conditions in the first cracker to produce a first cracker product mixture comprising olefins;
   (V) feeding at least a portion of the first cracker product mixture into an olefin-to-gasoline ("OTG") reaction zone;
   (VI) converting at least a portion of the first cracker product mixture into gasoline in the presence of an OTG catalyst in the OTG reaction zone; and
   (VII) obtaining an OTG product mixture from the OTG reaction zone; wherein the first cracker is a fluidized bed cracker, and the process further comprises:
   feeding a plurality of solid particles and a gas stream into the first cracker upstream of the first inlet to form a fluidized bed of the solid particles;
   contacting the solid particles with the bottoms hydrocarbons in the first cracker to effect pyrolysis of at least a portion of the bottoms hydrocarbons; and
   regenerating a portion of the solid particles;
   wherein the first inlet is located in the vicinity of the top of the fluidized bed of the solid particles.

2. The process of claim 1, wherein the flashing drum is operated at a cutpoint of the liquid bottoms effluent in the range from 371 to 482° C. (700 to 900° F.) at an absolute pressure in the range from 280 to 1850 kilopascal.

3. The process of claim 1, wherein the first set of cracking conditions comprise a residence time in the first cracker of no greater than 1 second.

4. The process of claim 1, wherein the first cracker is a fluid coking cracker, and the solid particles are coke particles.

5. The process of claim 1, wherein the gas stream comprises molecular oxygen and optionally steam.

6. The process of claim 1, wherein the top of the fluidized bed of the solid particles has a temperature in the range from 593 to 982° C. (1100 to 1800° F.) and an absolute pressure in the range from 100 to 1724 kilopascal (from near atmospheric pressure to 250 psi).

7. The process of claim 1, further comprising:
   recovering from the OTG product mixture in a first product recovery zone to obtain one or more of:
   a first gas stream comprising hydrogen, methane, C2-C4 hydrocarbons, $CO_2$, and steam;
   a first naphtha stream;
   a distillate stream; and
   a first tar stream.

8. The process of claim 7, further comprising:
   separating the first gas stream to obtain one or more of: a first fuel gas stream comprising methane, a first hydrogen stream, and a first C2-C4 hydrocarbon stream.

9. The process of claim 8, further comprising:
   feeding the first tar stream and hydrogen into a hydrotreater, where the hydrogen is optionally at least partly derived from the first hydrogen stream; and
   producing a low-sulfur hydrocarbon fuel product from the hydrotreater.

10. The process of claim 8, further comprising:
    feeding at least a portion of the first C2-C4 hydrocarbon stream to the second product recovery zone.

11. The process of claim 1, further comprising:
    (VIII) feeding the overhead effluent into a second cracker, the second cracker being a steam cracker;
    (IX) obtaining a second cracker product mixture from the second cracker; and
    (X) recovering from at least a portion of the second cracker product mixture in a second product recovery zone one or more of: one or more light olefins; a second hydrogen stream; a second fuel gas stream comprising methane; a steam cracked naphtha stream; and a second tar stream.

12. The process of claim 11, further comprising:
    feeding the second tar stream and optionally at least a portion of the second hydrogen stream into the hydrotreater.

13. The process of claim 1, further comprising:
    adjusting a cutpoint of the bottoms effluent in the flashing drum to vary the quantities of the overhead effluent and the bottoms effluent, thereby varying the quantities of the plurality of hydrocarbon products produced.

14. The process of claim 1, wherein the petroleum feed is a crude oil or a mixture thereof.

15. A process for processing a petroleum feed to produce a plurality of hydrocarbon products, the process comprising:
    (I) feeding the petroleum feed to a flashing drum;
    (II) obtaining a liquid bottoms effluent comprising bottoms hydrocarbons and a vapor overhead effluent comprising overhead hydrocarbons from the flashing drum, wherein the bottoms hydrocarbons optionally comprise a non-volatile component;
    (III) feeding at least a portion of the bottoms effluent to a first cracker through a first inlet on the first cracker;
    (IV) converting at least a portion of the bottoms hydrocarbons under a first set of cracking conditions in the first cracker to produce a first cracker product mixture comprising olefins;
    (V) feeding at least a portion of the first cracker product mixture into an olefin-to-gasoline ("OTG") reaction zone;
    (VI) converting at least a portion of the first cracker product mixture into gasoline in the presence of an OTG catalyst in the OTG reaction zone; and (VII) obtaining an OTG product mixture from the OTG reaction zone; wherein the first cracker is an oxidative cracker, and the process comprises:

feeding an oxidizing gas stream comprising molecular oxygen and optionally steam into the first cracker through a second inlet upstream of the first inlet; and oxidizing at least a portion of the bottoms hydrocarbons in an oxidation zone in the first cracker, such that the maximum temperature in the oxidation zone is from 1000 to 1400° C., to effect pyrolysis of at least a portion of the bottoms hydrocarbons.

16. The process of claim 1, further comprising:

quenching the first cracker product mixture with a quenching stream in a quenching zone before feeding the at least a portion of the first cracker product mixture into the OTG reaction zone to produce a quenched first cracker product mixture.

17. The process of claim 16, wherein the quenching stream comprises crackable C2 to C4 hydrocarbons.

18. The process of claim 16, wherein the quenching stream is derived, at least in part, from the vapor overhead effluent obtained from the flashing drum.

19. The process of claim 16, further comprising:

cooling the first cracker product mixture or the quenched first cracker product mixture by using a heat exchanger in an indirect cooling zone.

20. The process of claim 16, wherein upon quenching and/or indirect cooling, the first cracker product mixture enters into the OTG reaction zone at a temperature in the range from 260 to 816° C. (500 to 1500° F.).

21. The process of claim 16, wherein the OTG reaction zone is immediately downstream of the quenching zone or the indirect an indirect cooling zone, and the first cracker, the quenching zone and/or the indirect cooling zone, and the OTG reaction zone are located inside a common vessel.

22. A system for processing a petroleum feed comprising non-volatile components, the reaction system comprising:

(A) a flashing drum comprising an inlet adapted for receiving a petroleum feed, an upper outlet in the vicinity of the top thereof adapted for discharging a vapor overhead effluent, and a lower outlet in the vicinity of the bottom thereof adapted for discharging a liquid bottoms effluent;

(B) a first cracker comprising a first inlet adapted for receiving the bottoms effluent in fluid communication with the flashing drum, a second inlet adapted for receiving a plurality of solid particles carried in a gas stream upstream of the first inlet, and an outlet for discharging a first cracker product mixture, the first cracker capable of operating under a first set of cracking condition to effect pyrolysis of at least a portion of the bottoms effluent to produce the first cracker product mixture;

(C) an optional quenching zone immediately downstream of the first cracker in fluid communication with the first cracker adapted for receiving the first cracker product mixture and a quenching stream to mix with the first cracker product mixture to cool down the first cracker product mixture and discharging a quenched effluent;

(D) an optional indirect cooling zone immediately downstream of the quenching zone and in fluid communication with the quenching zone adapted for receiving the quenched effluent if the quenching zone is present, or immediately downstream of the first cracker in fluid communication with the first cracker adapted for receiving the first cracker product mixture if the optional quenching zone is absent, the indirect cooling zone comprising a heat exchanger and producing a cooled effluent;

(E) an olefin-to-gasoline ("OTG") reaction zone immediately downstream of the optional indirect cooling zone, if present, or immediately downstream of the quenching zone, if the optional indirect cooling zone is absent, the OTG reaction zone comprises an inlet for receiving the quenched effluent or the cooled effluent and an outlet for discharging an OTG product mixture; and (F) a first product recovery zone adapted for receiving at least a portion of the OTG product mixture, and separate one or more of the following therefrom: hydrogen; C2-C4 hydrocarbons; naphtha, gas oil; and tar; and (G) a second cracker, which is a steam cracker, adapted for receiving at least a portion of the overhead effluent from the flashing drum, and discharging a steam cracker product mixture comprising olefins, the second cracker capable of operating under a second set of cracking condition to effect pyrolysis of at least a portion of the overhead effluent to produce the steam cracker product mixture; and (H) a second product recovery zone adapted for receiving at least a portion of the steam cracker product mixture, and separate one or more of the following therefrom: hydrogen; C2-C4 hydrocarbons; steam cracking naphtha, and tar.

23. The system of claim 22, further comprising:

(I) a hydrotreater adapted for receiving the tar produced in the first product recovery zone and the second product recovery zone, and hydrogen produced in the first product recovery zone and/or the second product recovery zone, the hydrotreater capable of converting at least a portion of the tar to low-sulfur distillate.

* * * * *